Patented May 11, 1926.

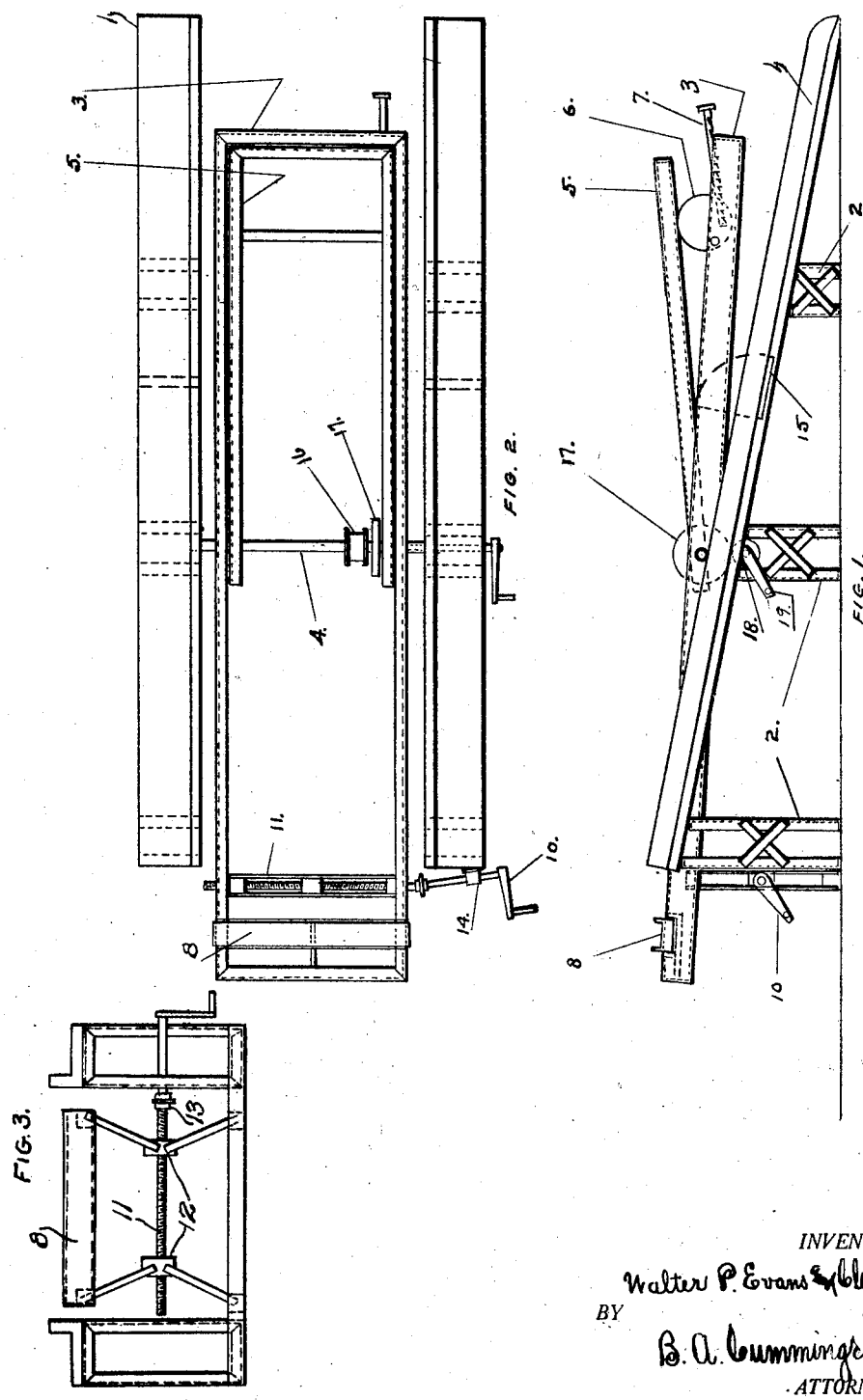

1,584,169

UNITED STATES PATENT OFFICE.

WALTER P. EVANS AND CLAUDE E. HORTON, OF LOS ANGELES, CALIFORNIA.

AUTOMOBILE SERVICE JACK.

Application filed January 26, 1925. Serial No. 4,829.

Our invention relates to apparatus for elevating motor and other vehicles for the purpose of performing work thereon.

The object of this invention is to provide what we designate as an automobile service jack, which is simple, efficient and readily adjustable and adaptable to the varying requirements which such a device should be able to meet. It is equally serviceable for facilitating work in garage or shop or as a wash and grease rack.

The use of our invention makes all parts of the body and chassis of a motor vehicle readily accessible without having to crawl underneath such vehicle, or getting into other cramped, exhausting and dangerous positions.

The mechanism of our device makes it possible to raise the body and chassis of a car either together, separately or one end at a time, by a single operation, thereby saving much time and effort.

An important feature of our invention is that when a car is placed in position thereon, all the wheels are left free and the rear end mechanism of the car is quickly made accessible to remove the rear axle housing, which is ordinarily a difficult undertaking.

In the accompanying drawings, Figure 1 is a horizontal side view of my invention, Figure 2 is a top view, and Figure 3 is an end view showing the screw drive and universal joint, which are a part of the tilting mechanism.

Referring with particularity to the drawings, the inclined run-way 1, supported by the standards 2, constitute the framework of my invention. Disposed therein is the tilting sill 3 which is pivoted on the shaft 4 and which carries the car upon leaving the run-way 1. An inner tilting rack 5 is also pivoted to the shaft 4, which tilting rack is raised or lowered to engage the rear axle housing of the car by means of the cam 6, which is pivoted to the sill 3 and retained in position by the ratchet 7. Initially the sill 3 and inner tilting rack 5 are on the same plane as the runway 1 and as the car reaches the top of this run-way the front axle takes its position in the slidable member 8, which is secured by the latch 9. As the car proceeds up the run-way 1 the member 8 slides along the sill 3, carrying the entire weight of the front end of the car and causing the front wheels to advance beyond the end of the run-way and thereby to become free. The front end of the sill 3 is then lowered to the desired position by means of the crank 10 and screw drive 11, operating through the burrs 12, said screw drive 11 being provided with a universal joint 13 and swing bearing 14, which give it the required flexibility. The inner tilting rack 5 is then raised to engage the rear axle housing of the car by means of the cam 6 and by continued operation of the crank 10 the rear wheels are lifted from the run-way, thereby becoming free. To remove the rear axle housing of the car the folding strut 15, which is disposed in a recess in the sill 3, is raised to engage the running board of the car, when by a reverse movement of the crank 10 the rear end of the sill 3 is lowered, thereby shifting the load to the strut 15, thus leaving the rear end mechanism of the car readily accessible for removal or repair. Disposed on the shaft 4 is a drum 16, operated by spur gears 17 and 18 and crank 19, and which mechanism is adapted to pulling cars up the runway 1 when they cannot make the ascent under their own power.

Having thus described our invention, what we claim as new and desire to secure by Letters Patent is:

1. In an automobile service jack a framework, tilting members disposed thereon, a tilting rack disposed in the rear portion of said framework, a screw drive provided with a crank and a universal joint for operating said tilting members, swing bearings for said drive and a hoisting cam for operating said tilting rack.

2. In an automobile service jack a framework, tilting members disposed thereon, a tilting rack disposed in said frame-work, a screw drive provided with a crank and a universal joint for operating said tilting members, swing bearings for said shaft, a hoisting cam for operating said tilting rack, a drive disposed in said tilting rack and a drum disposed on said shaft.

WALTER P. EVANS.
CLAUDE E. HORTON.